United States Patent [19]

Morini et al.

[11] Patent Number: 5,723,400
[45] Date of Patent: Mar. 3, 1998

[54] PROCESS FOR THE PREPARATION OF A SOLID CATALYST COMPONENT SUITABLE FOR THE POLYMERIZATION OF OLEFINS WHICH INCLUDES AT LEAST TWO ADDITIONS OF AN ELECTRON DONOR

[75] Inventors: Giampiero Morini, Pavia; Enrico Albizzati, Novara; Giulio Balbontin; Giovanni Baruzzi, both of Ferrara; Antonio Cristofori, Occhiobello, all of Italy

[73] Assignee: Montell North America Inc., Wilmington, Del.

[21] Appl. No.: 603,962

[22] Filed: Feb. 20, 1996

[30] Foreign Application Priority Data

Feb. 21, 1995 [IT] Italy ............... MI95A0319

[51] Int. Cl.$^6$ ......................... B01J 4/60
[52] U.S. Cl. .............. 502/126; 502/103; 502/115; 502/134; 502/119; 502/156
[58] Field of Search ................ 502/126, 103, 502/115, 134, 119, 156

[56] References Cited

U.S. PATENT DOCUMENTS

| | | | |
|---|---|---|---|
| 4,220,554 | 9/1980 | Scata et al. | 252/429 |
| 4,971,937 | 11/1990 | Albizzati et al. | 502/126 |
| 5,068,213 | 11/1991 | Albizzati et al. | 502/126 |
| 5,122,492 | 6/1992 | Albizzati et al. | 502/126 |
| 5,244,855 | 9/1993 | Morini et al. | 502/126 |
| 5,247,032 | 9/1993 | Kioka et al. | 526/128 |
| 5,468,704 | 11/1995 | Morini et al. | 502/115 |

FOREIGN PATENT DOCUMENTS

| | | |
|---|---|---|
| 0 361 494 | 4/1990 | European Pat. Off. . |
| 0 585 869 | 3/1994 | European Pat. Off. . |

*Primary Examiner*—Walter D. Griffin
*Assistant Examiner*—Nadine Preisch

[57] ABSTRACT

Process for the preparation of a solid catalyst component for olefins polymerization including (1) a magnesium halide in active form, (2) a titanium compound, and (3) an electron-donor compound selected from particular 1,3-diethers, the process being carried out by reaction between the compounds from (1) to (3), and including at least two additions of electron-donor (3) in the following order:

a) one addition prior to or during a reaction with the titanium compound or with a halogenated compound, and then b) one addition prior to or during a further reaction with the titanium compound.

18 Claims, No Drawings

PROCESS FOR THE PREPARATION OF A SOLID CATALYST COMPONENT SUITABLE FOR THE POLYMERIZATION OF OLEFINS WHICH INCLUDES AT LEAST TWO ADDITIONS OF AN ELECTRON DONOR

The present invention concerns a process for the preparation of solid catalyst components.

Published European patent application No. 361 494 describes solid catalyst components comprising a magnesium halide in active form, and supported on the latter a titanium compound containing at least one Ti-halide bond and an internal electron-donor compound selected from the ethers containing two or more ether groups, and having particular reaction characteristics towards the magnesium chloride and the $TiCl_4$.

BACKGROUND OF THE INVENTION

The catalysts obtained from the above mentioned catalyst components, by way of reaction of the latter with an aluminum alkyl compound, exhibit high activity and stereospecificity in the polymerization of olefins, and do not require the use of external electron-donors.

According to published European patent application No. 361494, the internal electron-donor is introduced by performing only one addition of the electron-donor itself in one of the stages of the preparation of the solid catalyst component, generally prior to or during the reaction with the titanium compound.

SUMMARY OF THE INVENTION

It has now been found that if in the preparation of the above mentioned solid catalyst components one makes at least two successive electron-donor additions in the proper order, one obtains solid catalyst components capable of conferring to the catalyst obtained from them an improved activity/stereospecificity balance in the polymerization of olefins.

Therefore, one of the objects of the present invention is a process for the preparation of a solid catalyst component comprising (1) a magnesium halide in active form, and, supported thereon, (2) a titanium compound having at least one Ti-halogen bond, and (3) an electron-donor compound selected from the group consisting of the 1,3-diethers having the general formula:

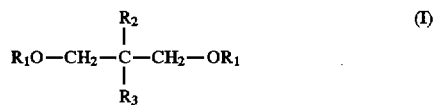

where $R_1$, $R_2$ and $R_3$, equal or different, are $C_1$–$C_{18}$ linear or branched alkyl $C_3$–$C_{18}$ cycloaliphatic, $C_6$–$C_{18}$ aryl, $C_7$–$C_{18}$ alkylaryl or $C_7$–$C_{18}$ aralkyl radicals, and $R_2$ or $R_3$ can also be hydrogen atoms; or from the 1,3-diethers where the carbon atom in position 2 belongs to a cyclic or polycyclic structure constituted by 5, 6, or 7 carbon atoms, or 5-n or 6-n' carbon atoms and n atoms of nitrogen and heteroatoms selected from the group consisting of N, O, S and Si respectively, where n is 1 or 2, and n' is 1, 2 or 3, said structure containing two or three unsaturations (cyclopolyenic structure) and optionally being condensed with other cyclic structures, or substituted with one or more substituents selected from the group consisting of linear or branched $C_1$–$C_{20}$ alkyl, $C_3$–$C_{20}$ cycloalkyl, $C_6$–$C_{20}$ aryl, $C_7$–$C_{20}$ aralkyl, $C_7$–$C_{20}$ alkylaryl radicals, and halogens, or being condensed with other cyclic structures and substituted with one or more of the above mentioned substituents that can also be bonded to the condensed cyclic structures; one or more of the above mentioned alkyl, cycloalkyl, aryl, aralkyl or alkylaryl radicals and the condensed cyclic structures optionally containing one or more heteroatoms as substitutes for the carbon or hydrogen atom, or both. The said process is carried out by way of reacting the magnesium halide (1) or one of its precursor, with the titanium compound (2) and the electron-donor compound (3), the reaction with the titanium compound (2) being optionally preceded by a reaction with a halogenated compound, and comprising at least two electron-donors (3) additions in the following order:

a) an addition prior to or during a reaction with the titanium compound (2) or with a halogenated compound, and then b) an addition prior to or during a further reaction with the titanium compound (2).

The catalysts obtained from the solid catalyst components prepared by the above mentioned process exhibit a stereospecificity substantially improved with respect to the catalysts obtained from the solid catalyst component prepared with the same internal electron-donor, but adding it only once. Said improved stereospecificity provides superior polymers of propylene and α-olefins, having high levels of crystallinity, and, therefore, improved mechanical properties.

Moreover, the activity of the catalyst obtained from the solid catalyst component prepared with the process of the present invention remains at very high levels, which makes said solid catalyst component very attractive for industrial use.

Furthermore, the process of the present invention has the advantage of being very simple, and can be conducted in the absence of solvents, with exception of the final washings of the solid catalyst component.

Therefore, it is preferable that at least addition b) of the electron-donor (3) be carried out in the absence of solvents.

More preferably, all the additions of electron-donor (3) are carried out in the absence of solvents.

It is also preferable to carry out addition b), and any succeeding ones, during the reaction or reactions with the titanium compound.

DETAILED DESCRIPTION OF THE PREFERRED EMBODIMENTS

A surprising aspect of the present invention is that the above mentioned results can be obtained only by using internal electron-donor of the type described above. For example, by using for additions a) and b) an electron-donor selected from the aromatic carboxylic acids esters, there is no improvement in the performance of the final catalyst compared to the case where there is only one addition.

In particular, in the 1,3-diethers of formula (I) $R_1$ is an alkyl radical with 1–6 carbon atoms, and more particularly it is a methyl; moreover, when $R_2$ is methyl, ethyl, propyl, or isopropyl, $R_3$ can be ethyl, propyl, isopropyl, butyl, isobutyl, tert-butyl, 2-ethylhexyl, isopentyl, cyclopentyl, cyclohexyl, methylcyclohexyl, phenyl or benzyl; when $R_2$ is hydrogen, $R_3$ can be ethyl, butyl, sec-butyl, tert-butyl, 2-ethylhexyl, cyclohexylethyl, diphenylmethyl, p-chlorophenyl, 1-naphthyl, 1-decahydronaphthyl; moreover $R_2$ and $R_3$ can be equal, and be ethyl, propyl, isopropyl, butyl, isobutyl, tert-butyl, isopentyl, neopentyl, phenyl, benzyl, cyclohexyl, cyclopentyl.

Specific examples of 1,3-diethers advantageous for use are:

2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-diethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(p-fluorophenyl)-1,3-dimethoxypropane, 2-(1-decahydronaphthyl)-1,3-dimethoxypropane, 2-(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibuthoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-di-neopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane.

The above 1,3-diethers of formula (I) (i.e., the 1,3-diethers and their methods of preparation are described in published European patent application No. 361 494.

Preferably the carbon atoms in positions 1 and 3 in the 1,3-diethers are secondary.

The substituents defined above for the 1,3-diethers are preferably selected from the group consisting of linear or branched $C_1$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkylaryl radicals; Cl and F.

The heteroatoms optionally present in the alkyl, cycloalkyl, aryl, aralkyl, alkylaryl radicals and/or in the condensed cyclic structures which are comprised in the 1,3-diethers are preferably selected from the group consisting of N; O; S; P; Si and halogens, in particular Cl and F.

Particularly preferred among the above 1,3-diethers are the compounds of formula:

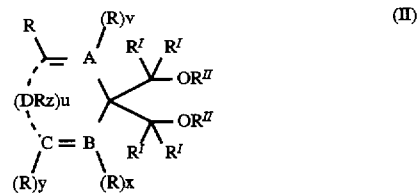

where A, B, C, and D, are carbon atoms or heteroatoms selected from the group consisting of N, O, Si and S; v, x, and y are 0 or 1; u and z are either 0, 1, or 2; provided that when u=0:

i) A, B, and C are carbon atoms and v, x, and y are equal to 1; or ii) A is a nitrogen atom, B and C are carbon atoms, v is equal to 0, and x and y are equal to 1; or iii) A and B are nitrogen atoms, C is a carbon atom, v and x are equal to 0, and y is equal to 1; or iv) A and B are carbon atoms, C is a nitrogen atom, v and x are equal to 1, and y is equal to 0;

when u=1:

i') A, B, C, and D are carbon atoms, v, x, and y are equal to 1, and z is equal to 2; or ii') A and B are carbon atoms, C is a nitrogen atom, D is an oxygen atom, v and x are equal to 1, y and z are equal to 0; or iii') A, B, and C are carbon atoms, D is an oxygen, nitrogen, sulfur, or silicon atom, v, x, and y are equal to 1, and z is equal to 0 when D is an oxygen or sulfur atom, equal to 1 when D is a nitrogen atom, and equal to 2 when D is a silicon atom;

when u=2:

A, B, and C are carbon atoms, D represents two carbon atoms bonded to each other by a single or double bond, v, x, and y are equal to 1, and z is equal to 1 when the couple of carbon atoms D is bonded by a double bond, and equal to 2 when said couple is bonded by a single bond;

radicals R and $R^I$, equal or different, are selected from the group consisting of hydrogen; halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals; the $R^{II}$ radicals, equal or different, are selected from the group consisting of $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals, and two or more of the R radicals can be bonded to each other to form a condensed cyclic structure, saturated or unsaturated, optionally substituted with $R^{III}$ radicals selected from the group consisting of halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals; said radicals from R to $R^{III}$ optionally containing one or more heteroatoms as substitutes for the carbon or hydrogen atom, or both.

Preferably in the compounds of formula (II) all the $R^I$ radicals are hydrogen, and each $R^{II}$ radical is methyl; the heteroatoms optionally present in the radicals from R to $R^{III}$ are preferably selected from the group consisting of N; O; S; P; Si, and halogens, in particular Cl and F.

A preferred group of the compounds of formula (II) comprises the compounds of the general formula:

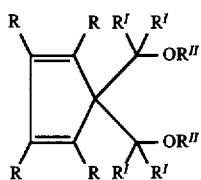

where the radicals from R to R" are as defined above for formula (II).

In particular, two or more of the R radicals can be bonded to each other to form one or more condensed cyclic structures, preferably benzenic, optionally substituted by $R^{III}$ radicals.

Specific examples of compounds comprised in formula (III) are:

1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene;
1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethylsilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene; and
9,9-bis(methoxymethyl)-4-tert-butylfluorene.

Other examples of 1,3-diethers (3.2) comprised in the definitions above are:

1,1-bis(1'-butoxyethyl)-cyclopentadiene;
1,1-bis(1'-isopropoxy-n-propyl)cyclopentadiene;
1-methoxymethyl-1-(1'-methoxyethyl)-2,3,4,5-tetramethylcyclopentadiene;
1,1-bis(α-methoxybenzyl)indene;
1,1-bis(phenoxymethyl)indene;
1,1-bis(1'-methoxyethyl)-5,6-dichloroindene;
1,1-bis(phenoxymethyl)-3,6-dicyclohexylindene;
1-methoxymethyl-1-(1'-methoxyethyl)-7-tert-butylindene;
1,1-bis[2-(2'-methoxypropyl)]-2-methylindene;
3,3-bis(methoxymethyl)-3H-2-methylbenz[e]indene;
9,9-bis(α-methoxybenzyl)fluorene;
9,9-bis(1'-isopropoxy-n-butyl)-4,5-diphenylfluorene;
9,9-bis(1'-methoxyethyl)fluorene;
9-(methoxymethyl)-9-(1'-methoxyethyl)-2,3,6,7-tetrafluorofluorene;
9-methoxymethyl-9-pentoxymethylfluorene;
9-methoxymethyl-9-ethoxymethylfluorene;
9-methoxymethyl-9-(1'-methoxyethyl)-fluorene;
9-methoxymethyl-9-[2-(2-methoxypropyl)]-fluorene.
1,1-bis(methoxymethyl)-2,5-cyclohexadiene;
1,1-bis(methoxymethyl)benzonaphthene;
7,7-bis(methoxymethyl)-2,5-norbornadiene;
9,9-bis(methoxymethyl)-1,4-methanedihydronaphthalene;
4,4-bis(methoxymethyl)-4H-cyclopenta[d,e,f]phenanthrene;
9,9-bis(methoxymethyl)-9,10-dihydroanthracene;
7,7-bis(methoxymethyl)-7H-benz[d,e]anthracene;
1,1-bis(methoxymethyl)-1,2-dihydronaphthalene;
4,4-bis(methoxymethyl)-1-phenyl-3,4-dihydronaphthalene;
4,4-bis(methoxymethyl)-1-phenyl-1,4-dihydronaphthalene;
5,5-bis(methoxymethyl)-1,3,6-cycloheptatriene;
5,5-bis(methoxymethyl)-10,11-dihydro-5H-dibenzo [a,d] cycloheptene;
5,5-bis(methoxymethyl)-5H-dibenzo[a,d]cycloheptene;
9,9-bis(methoxymethyl)xanthene;
9,9-bis(methoxymethyl)-2,3,6,7-tetramethylxanthene;
9,9-bis(methoxyisobutyl)thioxanthene;
4,4-bis(methoxymethyl)-1,4-pyran;
9,9-bis(methoxymethyl)N-tert-butyl-9,10-dihydroacridine;
4,4-bis(methoxymethyl)-1,4-chromene;
4,4-bis(methoxymethyl)-1,2,4-oxazine;
1,1-bis(methoxymethyl)benzo-2,3,1-oxazine;
5,5-bis(methoxymethyl)-1,5-pyrindine;
5,5-bis(methoxymethyl)-6,7-dimethyl-1,5-pyrindine;
2,2-bis(methoxymethyl)-3,4,5-trifluoroisopyrrole;
4,4-bis(1'-methoxyethyl)benzo-N-phenyl-1,4-dihydropyridine.

The 1,3-diethers (3.2) used in the catalyst components of the present invention can be prepared by first synthesizing the cyclopolyendimethylol by reaction of the desired cyclopolyene with paraformaldehyde in the presence of sodium alcoholate (as described by B. WESSLEN, ACTA CHEM. SCAND. 21 (1967) 718–20), and then transforming the derived dimethylol into the corresponding diether by way of alkylation, cycloalkylation, or arylation, according to known techniques, such as by reaction of the derived dimethylol with an alkyl, cycloalkyl, or aryl halide in the presence of a strong base, such as NaH, in a suitable solvent, such as tetrahydrofuran.

As stated above, the process of the present invention is carried out by causing the above mentioned electron-donors (3) to react with the magnesium halide (1), or one of its precursor, and the titanium compound (2), where the reaction with the titanium compound (2) is optionally preceded by a reaction with a halogenated compound.

The precursors of the magnesium halide are compounds which are capable of forming the magnesium halide in active form by reaction with a halogenated compound and/or a titanium compound (2).

Examples of the above mentioned precursors are:
Grignard RMgX compounds where R is a $C_1$–$C_{20}$ hydrocarbon radical, such as $C_1$–$C_{20}$ alkyl or $C_3$–$C_{20}$ cycloalkyl, $C_6$–$C_{20}$ aryl, $C_7$–$C_{20}$ alkylaryl or $C_7$–$C_{20}$ aralkyl; X is halide, preferably Cl;

$MgR_2$ compounds where R is as defined above;

$MgCl_2 \cdot nROH$ adducts where n generally ranges from 1 to 3, and R is as defined above;

$Mg(OR)_2$ compounds where R is as defined above;

$X_n Mg(OR)_{2-n}$ compounds where $0<n<2$ and X and R are as defined above;

complexes of magnesium halide with titanium alcoholates.

The titanium compound (2) is preferably selected from the titanium halides and halogen alcoholates, such as $TiCl_3OR$ where R is, for example, a $C_1$–$C_{20}$ alkyl or a phenyl radical.

Titanium tetrachloride is the preferred compound.

Preferred examples of halogenated compounds are the silicon compounds containing halogens, in particular chlorine.

Examples of said compounds are compounds of the formula $SiX_{4-n}Y_n$, where X and Y are halogen atoms, and n is a number from 0 to 3, such as $SiCl_4$; the chlorosiloxanes of formula $Si_nO_{n-1}Cl_{2n+2}$, where n is a number from 2 to 7, for example $Si_2OCl_6$; halogenated polysilanes of formula $Si_nX_{n+2}$, where X is a halide and n is a number from 2 to 6, such as $Si_4Cl_{10}$; alkylhalogenosilanes of the formula $R_{4-n}SiX_n$ where R is a $C_1$–$C_{20}$ aliphatic or aromatic radical, X is halide, and n is a number from 1 to 3, such as $C_2H_5SiCl_3$, $(CH_3)_3SiCl_2$; halogenated alcoxanes of formula $Si(OR)_{4-n}X_n$ where X is halide, R is a $C_1$–$C_{20}$ alkyl or an aryl radical, and n is a number from 1 to 3, such as $Si(OC_2H_5)Cl_3$.

Other examples of halogenated compounds are the hydrohalogenic acids, such as HCl and thionyl chloride.

The silicon tetrachloride is particularly preferred among the halogenated compounds.

Examples of solvents that can be used in the process of the present invention are aliphatic, cycloaliphatic, aromatic or chlorinated hydrocarbon solvents such as hexane, heptane, cyclohexane, toluene, ethylbenzene, chlorobenzene, and dichloroethane.

The reactions between compounds (1), (2), and (3), and optionally the halogenated compound, can be carried out according to methods known in the art. The reaction order is not particularly critical.

However, as stated above, the reaction with the halogenated compound, that is normally used to convert the precursors into magnesium halides, is carried out prior to the reaction with the titanium compound (2).

In addition to the compounds and reactions described above it is also possible to use the compounds and reactions known in the art during the preparation of the solid catalyst component according to the process of the present invention.

The Mg/electron-donor (3) molar ratio used in the reactions mentioned above preferably ranges from 4:1 to 12:1 for additions a) and b) as well as any further addition. The quantity of electron-donor (3) used in said additions can be equal or different.

The titanium compound (2) is preferably used in molar excess with respect to the total quantity of magnesium halide (1), or its precursor, and electron-donor (3).

The reactions with titanium compound (2), the additions of electron-donor (3), and the reaction of the same with other compounds are preferably carried out at temperatures ranging from 0° to 135° C.

After addition b), or at any rate after the last addition of electron-donor (3), it is preferable to carry out another reaction with titanium compound (2) under the conditions described above.

Below are given some specific examples of process of preparing of the solid catalyst component, which in itself constitutes one of the objects of the present invention.

According to a variant of the process of the present invention, the magnesium halide (used anhydrous, containing less than 1% water), the titanium compound, and the electron-donor (3) are milled together under conditions that cause the activation of the magnesium halide; the milled product is then caused to react one or more times with the $TiCl_4$ in excess, optionally in the presence of an electron-donor (3), at a temperature ranging from 80° to 135° C. The solid obtained is separated, caused to react with excess $TiCl_4$ at temperatures ranging from 80° to 135° C., separated again, and then repeatedly washed with a hydrocarbon (hexane, for example) until no more chlorine ions can be detected in the wash liquid.

According to another method the anhydrous magnesium halide is preactivated according to known methods and then reacted with an excess of $TiCl_4$ containing the electron-donor (3), and optionally one of the above mentioned types of hydrocarbons. In this case also the operation takes place at a temperature ranging from 80° to 135° C. The reaction with $TiCl_4$, in the presence of electron-donor (3), is repeated at least once. The solid is then separated, caused to react with $TiCl_4$ in excess at temperatures from 80° to 135° C., separated again and washed with hexane to eliminate all traces of nonreacted $TiCl_4$.

According to another method, a $MgCl_2 \cdot nROH$ adduct (particularly in the form of spheroidal particles) where n is generally from 1 to 3, and ROH is an alcohol, such as ethanol, butanol, isobutanol, is caused to react with an excess of $TiCl_4$ containing the electron-donor (3), and optionally one of the above mentioned types of hydrocarbon solvents. The reaction temperature initially is from 0° to 25° C., and then is increased to 80°–130° C. After reaction, the solid is separated and caused to react once more with $TiCl_4$, in the presence of electron-donor (3), then it is separated, caused to react with $TiCl_4$ in excess at a temperature from 80° to 135° C., separated again and washed with a hydrocarbon until no chlorine ions are detected in the wash liquid.

According to yet another method, magnesium alcoholates or chloroalcoholates (the chloroalcoholates can be prepared particularly as described in U.S. Pat. No. 4,220,554) are caused to react at least twice with $TiCl_4$ in excess containing electron-donor (3), then the solid product is caused to react with $TiCl_4$ in excess and washed at a temperature from 80° to 135° C., operating under the reaction conditions described above.

According to another method, magnesium halide complexes with titanium alcoholates (the $MgCl_2 \cdot 2Ti(OC_4H_9)_4$ complex is a typical example) are caused to react, in a hydrocarbon solution, with $TiCl_4$ in excess containing electron-donor (3) at a temperature ranging from 80° to 130° C.; the solid product is separated and is reacted again with an excess of $TiCl_4$, in the presence of electron-donor (3) at temperatures ranging from 80° to 130° C., and then separated again and washed with hexane.

According to another method, the complex between $MgCl_2$ and the titanium alcoholate is caused to react in hydrocarbon solution with hydropolysiloxane; the solid product that is separated is caused to react at 50° C. with silicon tetrachloride containing the diether; the solid is then caused to react with $TiCl_4$ in excess, in the presence of electron-donor (3) operating at 80°–130° C. The solid product is separated, caused to react with $TiCl_4$ in excess at temperatures ranging from 80° to 135° C., separated again and then washed with hexane.

Electron-donor (3) is fixed on the magnesium halide in quantities generally ranging from 5 to 20% molar.

The Mg/Ti ratio in the catalyst components of the invention generally ranges from 30:1 to 4:1.

The reactions indicated above cause the formation of magnesium halide in active form. In addition to these reactions, other reactions are well known in the art that bring to the formation of magnesium halide in active form starting from magnesium compounds different from magnesium halides.

The active form of the magnesium halides in the catalyst components of the invention is recognizable by the fact that in the X-ray spectrum of the catalyst component the major intensity reflection which appears in the spectrum of the nonactivated magnesium halides (having surface area smaller than 3 m²/g) does not appear, and in its place there is a halo with the maximum intensity shifted with respect to the position of the major intensity reflection, or by the fact that the major intensity reflection has a mid-height width at least 30% greater than the one of the corresponding reflection of the nonactivated Mg halide. The most active forms are those in which the halo appears in the X-rays spectrum of the solid catalyst component.

Among the magnesium halides, the chloride is the preferred compound. In case of the most active forms of the magnesium chloride, the halo appears in place of the reflection which in the spectrum of the inactive magnesium halide is situated at the interplanar distance of 2.56 Å.

The catalyst components of the invention, by reaction with Al-alkyl compounds, form catalysts suitable for use in the polymerization of $CH_2=CHR$ olefins, where R is a hydrogen, or an alkyl radical with 1–6 carbon atoms, or an aryl radical, or mixtures of said olefins with each other and/or with diolefins.

The Al-alkyl compounds comprise Al-trialkyls such as Al-triethyl, Al-triisobutyl, Al-tri-n-butyl and Al-trioctyl. Also suitable for use are the linear or cyclic Al-alkyl compounds containing two or more Al atoms bonded to each other by way of O, N, or S atoms.

Examples of said compounds are:

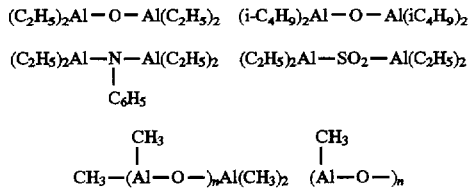

where n is a number between 1 and 20.

$AlR_2OR'$ compounds where R' is an $C_6-C_{20}$ aryl radical substituted at position 2 and/or 6, and R is a $C_1-C_6$ alkyl radical, can also be used as well as $AlR_2H$ compounds, where R is a $C_1-C_6$ alkyl.

The Al-alkyl compound is used in Al/Ti mole ratios generally from 1 to 1000.

The trialkyl compounds can also be used in a mixture with Al-alkyl halides such as $AlEt_2Cl$ and $AlEt_{3/2}Cl_{3/2}$.

The polymerization of olefins with the catalyst of this invention is carried out according to known methods operating in liquid phase, which consists of one or more olefin monomers, or a solution of one or more monomers in an aliphatic or aromatic hydrocarbon solvent, or in gas phase, or by a combination of liquid phase and gas phase.

The (co)polymerization temperature usually ranges from 0° to 150° C.; in particular from 60° to 100° C. The polymerization occurs at atmospheric pressure or higher.

The catalysts can be precontacted with small quantities of olefins (prepolymerization). The prepolymerization improves the performance of the catalysts as well as the morphology of the polymers.

The prepolymerization is carried out by maintaining the catalysts in suspension in a hydrocarbon solvent (hexane or heptane, for example) adding an olefin, and operating at a temperature ranging from ambient temperature to 60° C., producing a quantity of polymer generally from 0.5 to 3 times the weight of the catalyst. The polymerization can also be carried out in liquid monomer, under the temperature conditions indicated above, thus producing quantities of polymer which can reach 1000 g for each g of catalyst component.

In the case of stereoregular polymerization of olefins, in particular the propylene, it may be best to use, together with the Al-alkyl compound, an external electron-donor preferably selected from the group of silicon compounds containing at least one SiOR bond (R=hydrocarbon radical); 2,2,6,6-tetramethylpiperidine; 2,6-diisopropylpiperidine; carboxylic acid esters, such as ethylparatoluate and ethylbenzoate; and the 1,3-diethers (3.1) and (3.2) defined above.

Preferably the silicon compounds have the formula $R^4{}_nSi(OR^5)_{4-n}$ where n is 1 or 2; the $R^4$ radical or radicals, equal or different, are selected from the group consisting of $C_1-C_{12}$ alkyl, $C_3-C_{12}$ cycloalkyl, $C_6-C_{12}$ aryl, $C_7-C_{12}$ alkylaryl or $C_7-C_{12}$ aralkyl radicals;

radicals, where $R^6$ and $R^7$, equal or different, have the same meaning as define above for $R^4$, or are bonded to each other to form a cyclic structure; radicals $R^5$, equal or different, are a $C_1-C_6$ alkyl radical.

Optionally the radicals from $R^4$ to $R^7$ can contain one or more halogens, in particular Cl and F, as substitutes for the hydrogen atoms.

Examples of the silicon compounds include:

(tert-butyl)$_2$Si(OCH$_3$)$_2$;
(cyclohexyl)$_2$Si(OCH$_3$)$_2$;
(isopropyl)$_2$Si(OCH$_3$)$_2$;
(sec-butyl)$_2$Si(OCH$_3$)$_2$;
(cyclohexyl)(methyl)Si(OCH$_3$)$_2$;
(cyclopentyl)$_2$Si(OCH$_3$)$_2$;
(isopropyl)(methyl)Si(OCH$_3$)$_2$;
(n-butyl)$_2$Si(OCH$_3$)$_2$;
(isobutyl)$_2$Si(OCH$_3$)$_2$;
(sec-butyl)$_2$Si(OCH$_3$)$_2$;
(tert-butyl)(methyl)Si(OCH$_3$)$_2$;
(tert-amyl)(methyl)Si(OCH$_3$)$_2$;
(tert-hexyl)(methyl)Si(OCH$_3$)$_2$;
(2-norbornyl)(methyl)Si(OCH$_3$)$_2$;
(tert-butyl)(cyclopentyl)Si(OCH$_3$)$_2$;
(2-norbornyl)(cyclopentyl)Si(OCH$_3$)$_2$;
(tert-butyl)Si(OCH$_3$)$_3$;
(tert-butyl)Si(OC$_2$H$_5$)$_3$;
(2-norbornyl)Si(OCH$_3$)$_3$;
(2-norbornyl)Si(OC$_2$H$_5$)$_3$;
(tert-hexyl)Si(OCH$_3$)$_3$;
(tert-hexyl)Si(OC$_2$H$_5$)$_3$;
(tert-butyl)(2-methylpiperidyl)Si(OCH$_3$)$_2$;
(tert-butyl)(3-methylpiperidyl)Si(OCH$_3$)$_2$;
(tert-butyl)(4-methylpiperidyl)Si(OCH$_3$)$_2$;
(tert-hexyl)(piperidyl)Si(OCH$_3$)$_2$;

(tert-hexyl)(pyrrolidinyl)Si(OCH$_3$)$_2$;
(methyl)(3,3,3-trifluoropropyl)Si(OCH$_3$)$_2$;
(isopropyl)(3,3,3-trifluoropropyl)Si(OCH$_3$)$_2$;
(n-butyl)(3,3,3-trifluoropropyl)Si(OCH$_3$)$_2$;
(isobutyl)(3,3,3 -trifluoropropyl)Si(OCH$_3$)$_2$;
(sec-butyl)(3,3,3-trifluoropropyl)Si(OCH$_3$)$_2$;
(tert-butyl)(3,3,3-trifluoropropyl)Si(OCH$_3$)$_2$;
(3,3,3-trifluoropropyl)(piperidyl)Si(OCH$_3$)$_2$;
(3,3,3-trifluoropropyl)(2-methylpiperidyl)Si(OCH$_3$)$_2$;
(3,3,3-trifluoropropyl)(2-ethylpiperidyl)Si(OCH$_3$)$_2$;
(3,3,3-trifluoropropyl)(3-methylpiperidyl)Si(OCH$_3$)$_2$;
(3,3,3-trifluoropropyl)(4-methylpiperidyl)Si(OCH$_3$)$_2$; and
(3,3,3-trifluoropropyl)$_2$Si(OCH$_3$)$_2$.

The molar ratio of the Al-alkyl compound to the external electron-donor generally is from 5:1 to 100:1, and preferably from 10:1 to 30:1; this ratio can be wider, for instance from 0.5:1 to 100:1, during the prepolymerization phase.

As already indicated, the catalysts find particular application in the polymerization of CH$_2$=CHR olefins where R is a 1–6 carbon alkyl or aryl radical. In particular, said catalysts are useful for the polymerization of propylene or its copolymerization with ethylene or other α-olefins.

The above catalysts are also useful for the production of polyethylenes and copolymers of ethylene with α-olefins, such as 1-butene, 1-hexene, and 1-octene.

The following examples are given in order to illustrate and not limit the invention.

In these examples unless otherwise indicated, the parts and percentages are expressed by weight.

The melt flow rate L (MFR/L) for the polypropylene is determined according to ASTM D 1238, condition L.

In order to determine the fraction of polymer insoluble in xylene at 25° C. (X.I. %), 2.5 g of polymer are dissolved under agitation in 250 ml of xylene at 135° C., and after 20 minutes the content is allowed to cool to 25° C. After 30 minutes the precipitated polymer is filtered and dried at reduced pressure at 80° C. until constant weight is reached.

Synthesis of the 9,9-bis(hydroxymethyl)fluorene

Into a 500 ml flask, in anhydrous atmosphere, are introduced in order: 100 ml of dimethyl sulfoxide (DMSO) distilled on CaH, 8 g of paraformaldehyde (rendered anhydrous at ambient temperature and at a pressure of 2 torr for 8 hours), and 1.4 g of sodium ethylate dissolved in 6 ml of ethanol.

After having cooled the suspension by placing the flask in an ice bath (the melt temperature of the DMSO/EtOH mixture is 13° C.) and while maintaining the suspension under agitation, are added thereto over a period of thirty seconds, 100 ml of a solution of 16 g of fluorene in DMSO.

After 3 minutes from the beginning of the addition of the solution of fluorene in DMSO, the reaction is stopped by adding 1.5 ml of 37% aqueous HCl, and then the resulting mixture is diluted with 400 ml of water.

The mixture is saturated with NaCl, and 9,9-bis (hydroxymethyl)fluorene is extracted with ethyl acetate. The organic phase is then rendered anhydrous with anhydrous Na$_2$SO$_4$ and the solvent is flashed off. After crystallization by way of toluene, 15.2 g of product (yield: 70%) is obtained.

The $^1$H-NMR spectrum of the product in CDCl$_3$, at 200 Mhz and with tetramethylsilane (TMS) as internal standard, shows the following:

| 7.77 ppm, | doublet, | 2H aromatics |
| 7.62 ppm, | doublet, | 2H aromatics |
| 7.41 ppm, | triplet, | 2H aromatics |
| 7.32 ppm, | triplet, | 2H aromatics |
| 3.99 ppm, | douplet, | 4H CH$_2$ |
| 0.25 ppm, | triplet, | 2H OH. |

Synthesis of 9,9-bis(methoxymethyl)fluorene

Into a 100 ml flask are introduced, in nitrogen atmosphere, in order: 30 ml of tetrahydrofuran (THF), 11.3 g of 9,9-bis(hydroxymethyl)fluorene, and 31.1 ml of CH$_3$I.

While agitating the flask content and operating at ambient temperature, one adds 4 g of NaH at 60% by weight in mineral oil over a period of 2 hours and 30 minutes and the mixture content is then allowed to react for 1 hour and 30 minutes.

The nonreacted CH$_3$I is recorded by way of distillation and the remaining content is diluted with 100 ml of water; the resulting floating solid is filtered and dried under vacuum at 40° C. After ethanol crystallization, 11.3 g of product (yield: 90%) is obtained.

The $^1$H-NMR spectrum of the product in CDCl$_3$, at 200 Mhz and with TMS as internal standard, shows the following:

| 7.75 ppm, | doublet, | 2H aromatics |
| 7.65 ppm, | doublet, | 2H aromatics |
| 7.39 ppm, | triplet, | 2H aromatics |
| 7.29 ppm, | triplet, | 2H aromatics |
| 3.64 ppm, | singlet, | 4H CH$_2$ |
| 3.35 ppm, | singlet, | 6H CH$_3$. |

EXAMPLE 1

Into a 500 ml cylindric glass reactor equipped with a filtering barrier and a stirrer are introduced at 0° C. 225 ml of TiCl$_4$, and, while under agitation over a period of 15 minutes, 10.1 g (54 mmoles) of microspheroidal MgCl$_2$.2.1 C$_2$H$_5$OH obtained as described below.

At the end of the addition, the temperature of the reaction mixture is brought to 70° C., and 9 mmoles of 9,9-bis (methoxymethyl)fluorene are introduced (addition (a)).

The temperature is increased to 100° C. and, after 2 hours, the TiCl$_4$ is removed by filtration. 200 ml of TiCl$_4$ (second addition) and 9 mmoles of 9,9-bis(methoxymethyl)fluorene are added (addition (b)); after 1 hour at 120° C. the content is filtered again and another 200 ml of TiCl$_4$ are added, continuing the treatment at 120° C. for one more hour; finally, the content is filtered and washed at 60° C. with n-heptane until no chlorine ions are contained in the filtrate. The solid catalyst component obtained in this manner contains: Ti=3.5% by weight; 9,9-bis(methoxymethyl) fluorene=16.2% by weight.

The microspheroidal MgCl$_2$.2.1C$_2$H$_5$OH is prepared as follows. 48 g of anhydrous MgCl$_2$, 77 g of anhydrous C$_2$H$_5$OH, and 830 ml of kerosene are fed, in inert gas and at ambient temperature, into a 2 liter reactor equipped with a turbine agitator and in-line mixer. The content is heated to 120° C. while stirring thus forming the MgCl$_2$ alcohol adduct that melts and remains mixed with the dispersing agent. The nitrogen pressure inside the reactor is maintained at 15 atm. The in-line mixer of the reactor is heated externally to 120° C. with a heating jacket, has an inside diameter of 1 mm, and is 3 meters long from one end of the heating jacket to the other.

Then the mixture is transferred through the pipe at a velocity of 7 m/sec ca.

At the exit of the pipe the dispersion is gathered in a 5 l flask, under agitation, containing 2.5 l of kerosene, and being externally cooled by way of a jacket maintained at an initial temperature of –40° C.

The final temperature of the emulsion is 0° C.

The spherical solid product that constituted the dispersed phase of the emulsion is separated by way of settling and filtration, and then washed with heptane and dried.

All these operations are carried out in an inert gas atmosphere.

130 g of $MgCl_2.3C_2H_5OH$ in the form of spherical solid particles with a maximum diameter less than or equal to 50 micron are obtained.

The alcohol is removed from the product thus obtained at temperatures that are gradually increased from 50° C. to 100° C. in nitrogen atmosphere until the alcohol content is reduced to 2.1 moles per mole of $MgCl_2$.

Into a 4 liter reactor, previously purged for 1 hour with gaseous propylene at 70° C., are introduced, at ambient temperature and in propylene stream, 70 ml of anhydrous n-hexane containing 7 mmoles of aluminum triethyl and 4 mg of the solid catalyst component prepared as described above. The reactor is closed, 1.7 Nl of hydrogen and 1.2 kg of liquid propylene are introduced; the agitator is put in motion and the temperature of the reaction mixture is increased to 70° C. over a period of 5 minutes. After 2 hours at 70° C., the agitation is stopped, the nonpolymerized monomer is removed, and the content is cooled to ambient temperature.

380 g of polypropylene are discharged from the reactor, said polypropylene having a fraction insoluble in xylene at 25° C. (X.I.)=97.7%, and MFR/L=4.5 g/10 min. The polymer yield is 95,000 g of polypropylene/g of solid catalyst component.

EXAMPLE 2

The procedure of example 1 is used, except in preparing the solid catalyst component, for additions a) and b) two parts equal to 9 mmoles each of 2-isopropyl-2-isopentyl-1, 3-dimethoxypropane are used instead of 9,9-bis (methoxymethyl)fluorene. The solid catalyst component thus obtained contains: Ti=3.6% by weight; 2-isopropyl-2-isopentyl-1,3-dimethoxypropane=12.7% by weight.

The polymerization is then carried out as described in Example 1, using 5.7 mg of solid catalyst component. 400 g of polypropylene is obtained, said polypropylene having X.I.=98.0% and MFR/L=5.1 g/10 min. The polymer yield is 70.000 g of polypropylene/g of solid catalyst component.

EXAMPLE 3

Example 1 is repeated, except in preparing the solid catalyst component, for additions a) and b), two parts equal to 9 mmoles each of 2,2-diisobutyl-1,3-dimethoxypropane are used instead of 9,9-bis(methoxymethyl)fluorene. The product obtained contains: Ti=2.8% by weight; 2,2-diisobutyl-1,3-dimethoxypropane=14.7% by weight. Using 6.1 mg of solid catalyst component, 260 g of polypropylene is obtained having X.I.=96.9%, and MFR/L=4.9 g/10 min. The polymer yield is 42,600 g of polypropylene/g of catalyst component.

EXAMPLE 4

Example 1 is repeated, except in preparing the solid catalyst component, for additions a) and b), two parts equal to 9 mmoles each of 2,2-diisopentyl-1,3-dimethoxypropane are used instead of 9,9-bis(methoxymethyl)fluorene. The product contains: Ti=2.6% by weight; 2,2-diisopentyl-1,3-dimethoxypropane=17.6% by weight. Using 7.3 mg of solid catalyst component, 332 g of polypropylene is obtained having X.I.=95.2%, and MFR/L=5.2 g/10 min. The polymer yield is 45,400 g of polypropylene/g of catalyst component.

EXAMPLE 5

Example 1 is repeated, except in preparing of the solid catalyst component, for additions a) and b), two parts equal to 9 mmoles each of 2-isopropyl-2-cyclohexyl-1,3-dimethoxypropane are used instead of 9,9-bis (methoxymethyl)fluorene. The product obtained contains: Ti=3.2% by weight; 2-isopropyl-2-cyclohexyl-1,3-dimethoxypropane=13.2% by weight. Using 6.5 mg of solid catalyst component, 261 g of polypropylene is obtained having X.I.=97.2%, and MFR/L=5.9 g/10 min. The polymer yield is 40,200 g of polypropylene/g of catalyst component.

Comparative example 1

The procedure of example 1 is used, except in preparing the solid catalyst component the second addition of $TiCl_4$, addition b) of 9,9-bis(methoxymethyl)fluorene, and the subsequent reaction at 120° C. for 1 hour are omitted.

The preparation of the solid catalyst component is carried out as follows.

Into a 500 ml cylindrical glass reactor equipped with a filtering barrier are introduced at 0° C. 225 ml of $TiCl_4$, and, while under agitation over a period of 15 minutes, 10.1 g (54 mmoles) of microspheroidal $MgCl_2.2.1C_2H_5OH$ obtained as described in Example 1.

At the end of the addition, the temperature is increased to 70° C., and 9 mmoles of 9,9-bis(methoxymethyl)fluorene are introduced.

The temperature is increased to 100° C., and, after 2 hours, the $TiCl_4$ is then removed by filtration. 200 additional ml of $TiCl_4$ are added continuing the treatment at 120° C. for an other hour; finally, the content is filtered and washed at 60° C. with n-heptane until no chlorine ions are contained in the filtrate.

The solid catalyst component obtained in this manner contains: Ti=4% by weight; 9,9-bis(methoxymethyl) fluorene=13.1% by weight.

Using 3.8 mg of the above mentioned solid catalyst component, 438 g of polypropylene is obtained having X.I.=96.2%, and MFR/L=4.9 g/10 min.

The polymer yield is 115,300 g of polypropylene/g of solid catalyst component.

Comparative Example 2

The procedure of Example 2 is used, except in preparing the solid catalyst component the second addition of $TiCl_4$, addition b) of 2-isopropyl-2-isopentyl-1,3-dimethoxypropane, and the subsequent reaction at 120° C. for 1 hour are omited.

The resulting solid catalyst component contains: Ti=3.8% by weight; 2-isopropyl-2-isopentyl-1,3-dimethoxypropane= 11.1 by weight.

Using 5.1 mg of the above mentioned solid catalyst component 409 g of polypropylene are obtained having X.I.=97.2%, and MFR/L=5.9 g/10 min.

The polymer yield is 80,200 g of polypropylene/g of solid catalyst component.

Comparative Example 3

The procedure of Example 3 is used, except in preparing the solid catalyst component the second addition of $TiCl_4$, addition b) of 2,2-diisobutyl-1,3-dimethoxypropane, and the subsequent reaction at 120° C. for 1 hour are omited. The resulting solid catalyst component contains: Ti=3.5% by weight; 2,2-diisobutyl-1,3-dimethoxypropane=12.6% by weight.

Using 6.3 mg of the above mentioned solid catalyst component 349 g of polypropylene is obtained having X.I.=95.2%, and MFR/L=5.2 g/10 min.

The polymer yield is 55,400 g of polypropylene/g of solid catalyst component.

Comparative Example 4

The procedure of in Example 4 is used, except in preparing the solid catalyst component the second addition of $TiCl_4$, addition b) of 2,2-diisopentyl-1,3-dimethoxypropane, and the subsequent reaction at 120° C. for 1 hour are omited.

The resulting solid catalyst component contains: Ti=3.2% by weight; 2,2-diisopentyl-1,3-dimethoxypropane=16.5% by weight.

Using 6.7 mg of the above mentioned solid catalyst component one obtains 403 g of polypropylene is obtained having X.I.=93.6%, and MFR/L=6.9 g/10 min.

The polymer yield is 60,100 g of polypropylene/g of solid catalyst component.

Comparative Example 5

The procedure of Example 5 is used, except in preparing the solid catalyst component the second addition of $TiCl_4$, addition b) of 2-isopropyl-2-cyclohexyl-1,3-dimethoxypropane, and the subsequent reaction at 120° C. for 1 hour are omited.

The resulting solid catalyst component contains: Ti=3.9% by weight; 2-isopropyl-2-cyclohexyl-1,3-dimethoxypropane=11.5% by weight.

Using 7 mg of the above mentioned solid catalyst component 397 g of polypropylene is obtained having X.I.=96.1%, and MFR/L=6.3 g/10 min.

The polymer yield is 56,700 g of polypropylene/g of solid catalyst component.

Comparative Example 6

Into a 500 ml cylindric glass reactor equipped with a filtering barrier are introduced at 0° C. 225 ml of $TiCl_4$, and, while under agitation over a period of 15 minutes, 10.1 g (54 mmoles) of microspheroidal $MgCl_2.2.1$ $C_2H_5OH$ obtained as described in Example 1.

At the end of the addition, the temperature of the reaction mixture is increased to 40° C., and 9 mmoles of diisobutylphthalate are introduced.

The temperature of the reaction mixture is increased to 100° C. in the course of one hour, and the stirring is continued for 2 more hours. Then the $TiCl_4$ is removed by filtration, 200 more ml of $TiCl_4$ are added, the stirring continues for 1 more hour at 120° C. and finally the content is filtered and washed at 60° C. with n-heptane until no chlorine ions are contained in the filtrate. The solid catalyst component obtained in this manner contains: Ti=3.3% by weight; diisobutylphthalate=8.2% by weight.

The polymerization is carried out as in Example 1, except that the hexane suspension introduced in the polymerization reactor is comprised of the following: 70 ml of anhydrous n-hexane, 7 mmoles of aluminum triethyl, 8.4 mg of the above mentioned solid catalyst component, and 0.35 mmoles of dicyclopentyldimethoxysilane. 362 g of polypropylene is obtained, having X.I.=98%, and MFR/L=1.1 g/10 min.

The polymer yield is 43,100 g of polypropylene/g of solid catalyst component.

Comparative Example 7

Into a 500 ml cylindric glass reactor equipped with a filtering barrier are introduced at 0° C. 225 ml of $TiCl_4$, and, while under agitation over a period of 15 minutes, 10.1 g (54 mmoles) of microspheroidal $MgCl_2.2.1$ $C_2H_5OH$ obtained as described in Example 1.

At the end of the addition, the temperature of the reaction mixture is increased to 40° C., and 9 mmoles of diisobutylphthalate are introduced.

The temperature of the reaction mixture is increased to 100° C. in the course of one hour, and the stirring is continued for 2 more hours. Then the $TiCl_4$ is removed by filtration, 200 more ml of $TiCl_4$ and 9mmoles of diisobutylphthalate are added, the stirring continues for 1 more hour at 120° C. and the $TiCl_4$ is removed by filtration. Then 200 more ml of $TiCl_4$ are added, the stirring is maintained for 1 hour at 120° C., and finally the content is filtered and washed at 60° C. with n-heptane until no chlorine ions are contained in the filtrate. The solid catalyst component obtained in this manner contains: Ti=3.1% by weight; diisobutylphthalate=9.1% by weight.

The polymerization is carried out as in Comparative Example 6 using 8.1 mg of the above mentioned solid catalyst component. 326 g of polypropylene is obtained, having X.I.=97.9%, and MFR/L=1.2 g/10 min.

The polymer yield is 40,200 g of polypropylene/g of solid catalyst component.

A comparison of the data of comparative Examples 6 and 7 shows that if diisobutylphthalate is used in the process of this invention instead of the electron-donor (3) previously defined, it is not possible to obtain an increase in stereospecificity.

Other features, advantages and embodiments of the invention disclosed herein will be readily apparent to those exercising ordinaly skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for the preparation of a solid catalyst component suitable for the polymerization of olefins, comprising reacting a magnesium halide, or a magnesium halide precursor, with a titanium compound and an electron-donor compound to produce said solid catalyst component, wherein said electron-donor is added in at least two additions in the following order:

a) an addition of said electron-donor to said magnesium halide or magnesium halide precursor prior to or during a reaction of said titanium compound and said magnesium halide or magnesium halide precursor, and then b) an addition of said electron-donor prior to or during a further reaction of the product of (a) with said titanium compound; and wherein said electron-donor compound is selected from the group consisting of 1,3-diethers having the formula:

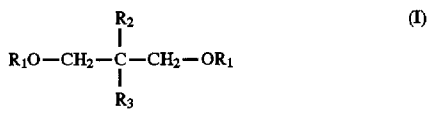

where $R_1$, $R_2$ and $R_3$, same or different, are $C_1$–$C_{18}$ linear or branched alkyl, $C_3$–$C_{18}$ cycloaliphatic, $C_6$–$C_{18}$ aryl, $C_7$–$C_{18}$ alkylaryl or $C_7$–$C_{18}$ aralkyl radicals, and $R_2$ or $R_3$ can also be a hydrogen atom; or from cyclopolyenic 1,3-diethers where the carbon atom in position 2 belongs to a cyclic or polycyclic structure containing 5, 6, or 7 carbon atoms, or 5-n or 6-n' carbon atoms and n atoms of nitrogen and n' heteroatoms selected from the group consisting of N, O, S and Si respectively, where n is 1 or 2, and n' is 1, 2 or 3, said structure containing two or three double bonds and optionally being condensed with other cyclic structures, or substituted with one or more substituents selected from the group consisting of linear or branched $C_1$–$C_{20}$ alkyl, $C_3$–$C_{20}$ cycloalkyl, $C_6$–$C_{20}$ aryl, $C_7$–$C_{20}$ aralkyl, $C_7$–$C_{20}$ alkylaryl radicals, and halogens or being condensed with other cyclic structures and substituted with one or more of the above mentioned substituents that can also be bonded to the condensed cyclic structures; one or more of the above mentioned alkyl, cycloalkyl, aryl, aralkyl and alkylaryl radicals and the condensed cyclic structures optionally containing one or more heteroatoms as substitutes for the carbon or hydrogen atom, or both.

2. The method of claim 1, wherein said magnesium halide is prepared by reaction of a magnesium halide precursor with a halogenated compound prior to reaction of said magnesium halide with said titanium compound.

3. The process of claim 1, where the 1,3-diether is selected from the group consisting of 2-isopropyl-2-isopentyl-1,3-dimetoxypropane; 2,2-diisobutyl-1,3-dimethoxypropane; 2,2-diisopentyl-1,3-dimethoxypropane; and 2-isopropyl-2-cyclohexyl-1,3-dimethoxypropane.

4. The process of claim 1, where the cyclopolyenic 1,3-diethers are selected from the compounds of formula:

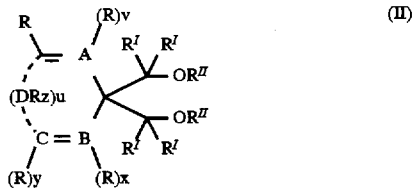

where A, B, C, and D, are carbon atoms or heteroatoms selected from the group consisting of N, O, Si and S; v, x, and y are 0 or 1; u and z are either 0, 1, or 2; provided that when u=0:

i) A, B, and C are carbon atoms and v, x, and y are equal to 1; or ii) A is a nitrogen atom, B and C are carbon atoms, v is equal to 0, and x and y are equal to 1; or iii) A and B are nitrogen atoms, C is a carbon atom, v and x are equal to 0, and y is equal to 1; or iv) A and B are carbon atoms, C is a nitrogen atom, v and x are equal to 1, and y is equal to 0;

when u=1:

i') A, B, C, and D are carbon atoms, v, x, and y are equal to 1, and z is equal to 2; or ii') A and B are carbon atoms, C is a nitrogen atom, D is an oxygen atom, v and x are equal to 1, y and z are equal to 0; or iii') A, B, and C are carbon atoms, D is an oxygen, nitrogen, sulfur, or silicon atom, v, x, and y are equal to 1, and z is equal to 0 when D is an oxygen or sulfur atom, equal to 1 when D is a nitrogen atom, and equal to 2 when D is a silicon atom;

when u=2:

A, B, and C are carbon atoms, D represents two carbon atoms bonded to each other by a single or double bond, v, x, and y are equal to 1, and z is equal to 1 when the couple of carbon atoms D is bonded by a double bond, and equal to 2 when said couple is bonded by a single bond;

radicals R and $R^I$, same or different, are selected from the group consisting of hydrogen; halogens; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals; the $R^{II}$ radicals, same or different, are selected from the group consisting of $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals, and two or more of the R radicals can be bonded to each other to form a condensed cyclic structure, saturated or unsaturated, optionally substituted with $R^{III}$ radicals selected from the group consisting of halogens; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals; said radicals from R to $R^{III}$ optionally containing one or more heteroatoms as substitutes for the carbon or hydrogen atom, or both.

5. The process of claim 4, where the cyclopolyenic 1,3-diethers are selected from the compounds of formula:

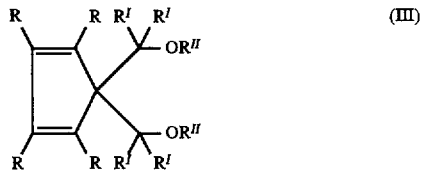

where radicals R and $R^I$, same or different, are selected from the group consisting of hydrogen; halogens; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals; the $R^{II}$ radicals, equal or different, are selected from the group consisting of $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals, and two or more of the R radicals can be bonded to each other to form a condensed cyclic structure, saturated or unsaturated, optionally substituted with $R^{III}$ radicals selected from the group consisting of halogens; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and aralkyl radicals; said radicals from R to $R^{III}$ optionally containing one or more heteroatoms as substitutes for the carbon or hydrogen atom, or both.

6. The process of claim 5, where the cyclopolyenic 1,3-diether is selected from the group consisting of 1,1-bis(methoxymethyl)-cyclopentadiene;

1,1-bis(methoxymethyl)-2,3,4,5-tetramethylcyclopentadiene;

1,1-bis(methoxymethyl)-2,3,4,5-tetraphenylcyclopentadiene;

1,1-bis(methoxymethyl)indene;

1,1-bis(methoxymethyl)-2,3-dimethylindene;

1,1-bis(methoxymethyl)-4,7-dimethylindene;

1,1-bis(methoxymethyl)-4-phenyl-2-methylindene;

1,1-bis(methoxymethyl)-7-(3,3,3-trifluoropropyl)indene;

1,1-bis(methoxymethyl)-7-trimethylxylylindene;

1,1-bis(methoxymethyl)-7-trifluoromethylindene;
1,1-bis(methoxymethyl)-7-methylindene;
1,1-bis(methoxymethyl)-7-cyclopenthylindene;
1,1-bis(methoxymethyl)-7-isopropylindene;
1-bis(methoxymethyl)-7-cyclohexylindene;
1-bis(methoxymethyl)-7-tert-butylindene;
1-bis(methoxymethyl)-7-tert-butyl-2-methylindene;
1-bis(methoxymethyl)-7-phenylindene;
1-bis(methoxymethyl)-2-phenylindene;
9-bis(methoxymethyl)fluorene;
9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene; and 9,9-bis(methoxymethyl)-4-tert-butylfluorene.

7. The process of claim 1, where the titanium compound is selected from the group consisting of titanium halides and halogen alcoholates.

8. The process of claim 7, where the titanium compound is titanium tetrachloride.

9. The process of claim 1, where the precursor of the magnesium halide is selected from the group consisting of:

Grignard RMgX compounds where R is a $C_1$–$C_{20}$ hydrocarbon radical, and X is halide;

$MgR_2$ compounds where R is as defined above;

$MgCl_2 \cdot nROH$ adducts where n ranges from 1 to 3, and R is as defined above;

$Mg(OR)_2$ compounds where R is as defined above;

$X_nMg(OR)_{2-n}$ compounds where $0<n<2$ and X and R are as defined above;

complexes of magnesium halide with titanium alcoholates.

10. The process of claim 1, where the halogenated compound is silicon tetrachloride.

11. The process of claim 1, where at least addition b) of electron-donor is carried out without solvents.

12. The process of claim 1, where addition b), and other optional electron-donor additions are carried out during the reaction or reactions with the titanium compound.

13. The process of claim 1, where the Mg/electron-donor molar ratio ranges from 4:1 to 12:1 for both additions a) and b), and optional further additions.

14. The process of claim 1, where the reaction of the titanium compound, the addition of electron-donor, and the reaction of same with other compounds are carried out at temperatures ranging from 0° to 135° C.

15. The process of claim 1, wherein $R_1$ is a $C_1$–$C_6$ alkyl radical.

16. The process of claim 1, wherein $R_2$ is selected from the group consisting of methyl, ethyl, propyl and isopropyl, and $R_3$ is selected from the group consisting of ethyl, propyl, isopropyl, butyl, isobutyl, tert-butyl, 2-ethylhexyl, isopentyl, cyclopentyl, cyclohexyl, methylcylcohexyl, phenyl and benzyl.

17. The process of claim 1, wherein $R_2$ is hydrogen, and $R_3$ is selected from the group consisting of ethyl, butyl, sec-butyl, tert-butyl, 2-ethylhexyl, cyclohexyl, diphenylmethyl, p-chlorophenyl, 1-napthyl, and 1-decahydronaphthyl.

18. The process of claim 1, wherein $R_2$ and $R_3$ are the same, and are selected from the group consisting of ethyl, propyl, isopropyl, butyl, isobutyl, tert-butyl, isopentyl, neopentyl, phenyl, benzyl, cyclohexyl and cyclopentyl.

* * * * *

UNITED STATES PATENT AND TRADEMARK OFFICE
CERTIFICATE OF CORRECTION

PATENT NO. : 5,723,400
DATED : March 3, 1998
INVENTOR(S) : Giampiero Morini et al It is certified that error appears in the above-identified patent and that said Letters Patent is hereby corrected as shown below:

At col. 18, line 19, change "$C_7-C_{20}$" to --$C_7-C_{20}$--.

At col. 18, line 43, change "equal" to --same--.

At col. 19, line 10, change "9-bis(methoxymethyl)fluorene" to --9,9-bis(methoxymethyl)fluorene--.

At col. 19, line 11, change "9-bis(methoxymethyl)-2,3,6,7-tetramethyl-fluorene" to --9,9-bis(methoxymethyl)-2,3,6,7-tetramethylfluorene--.

Signed and Sealed this

Twenty-first Day of July, 1998

Attest:

BRUCE LEHMAN

*Attesting Officer*     *Commissioner of Patents and Trademarks*